United States Patent
Kashio

(10) Patent No.: US 9,211,863 B2
(45) Date of Patent: Dec. 15, 2015

(54) HEAD-PROTECTING AIRBAG DEVICE

(71) Applicant: TOYODA GOSEI CO., LTD., Kiyosu-shi, Aichi-ken (JP)

(72) Inventor: Atsushi Kashio, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/578,565

(22) Filed: Dec. 22, 2014

(65) Prior Publication Data

US 2015/0210242 A1 Jul. 30, 2015

(30) Foreign Application Priority Data

Jan. 28, 2014 (JP) ................................. 2014-013752

(51) Int. Cl.
*B60R 21/232* (2011.01)
*B60R 21/26* (2011.01)
*B60R 21/213* (2011.01)
*B60R 21/231* (2011.01)
*B60R 21/214* (2011.01)

(52) U.S. Cl.
CPC ............. *B60R 21/232* (2013.01); *B60R 21/213* (2013.01); *B60R 21/214* (2013.01); *B60R 21/23138* (2013.01); *B60R 21/26* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,367,582 B2 * | 5/2008 | Nishizawa | ................. | 280/730.2 |
| 7,434,831 B2 * | 10/2008 | Noguchi et al. | ........... | 280/730.2 |
| 7,699,342 B2 * | 4/2010 | Goto | ........................ | 280/730.2 |
| 8,360,468 B2 * | 1/2013 | Sato et al. | ................. | 280/730.2 |
| 8,414,021 B2 * | 4/2013 | Tanaka et al. | .............. | 280/730.2 |
| 8,550,494 B2 * | 10/2013 | Ochiai et al. | ............... | 280/730.2 |
| 8,579,322 B2 * | 11/2013 | Saimura et al. | .............. | 280/729 |
| 8,622,420 B2 * | 1/2014 | Kato et al. | ................. | 280/730.2 |
| 2001/0035633 A1 * | 11/2001 | Kobayashi et al. | ........ | 280/730.1 |
| 2002/0101066 A1 * | 8/2002 | Tanase et al. | .............. | 280/730.2 |
| 2002/0105173 A1 * | 8/2002 | Saderholm et al. | ........ | 280/730.2 |
| 2002/0117839 A1 * | 8/2002 | Breyvogel et al. | ........ | 280/743.1 |
| 2003/0006588 A1 * | 1/2003 | Aoki et al. | ................. | 280/730.2 |
| 2003/0090094 A1 * | 5/2003 | Zerbe | ........................ | 280/730.2 |
| 2003/0222437 A1 * | 12/2003 | Tanaka | ........................ | 280/729 |
| 2004/0178610 A1 * | 9/2004 | Ogata | ........................ | 280/730.2 |
| 2005/0116451 A1 * | 6/2005 | Kino et al. | ................. | 280/730.2 |
| 2005/0218639 A1 * | 10/2005 | Maertens et al. | .......... | 280/743.1 |
| 2005/0269806 A1 * | 12/2005 | Huber et al. | .............. | 280/730.2 |
| 2006/0012156 A1 * | 1/2006 | Boxey | ........................ | 280/730.2 |
| 2008/0290634 A1 * | 11/2008 | Sugimori et al. | .......... | 280/728.2 |
| 2009/0236829 A1 | 9/2009 | Tanaka et al. | | |
| 2014/0353949 A1 * | 12/2014 | Sugimori | ................... | 280/728.2 |

FOREIGN PATENT DOCUMENTS

WO 2013/018781 A1 2/2013

* cited by examiner

*Primary Examiner* — Nicole Verley
(74) *Attorney, Agent, or Firm* — Posz Law Group, PLC

(57) ABSTRACT

A head-protecting airbag device has an airbag deployable downward from a housing area. The airbag includes front and rear window cover portions for covering front and rear windows and a pillar cover portion for covering a middle pillar located between the windows. The pillar cover portion includes in the upper region an inlet port for taking in an inflation gas from one of the window cover portions. The pillar cover portion further includes an upper portion extending in a front and rear direction from the inlet port, and a lower portion which communicates with the upper portion at an end of the upper portion facing away from the inlet port and turns around downward from the upper portion and extends in a front and rear direction beneath the upper portion. The leading end of the lower portion located generally beneath the inlet port is closed.

5 Claims, 8 Drawing Sheets

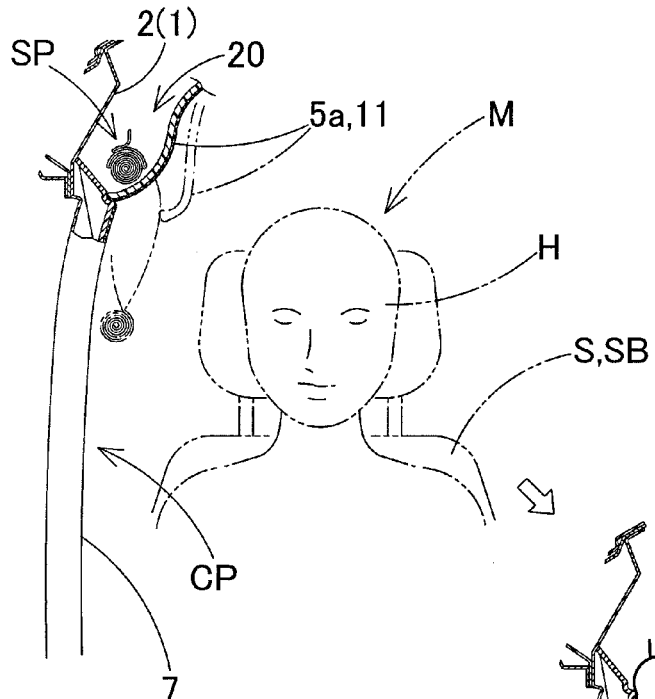
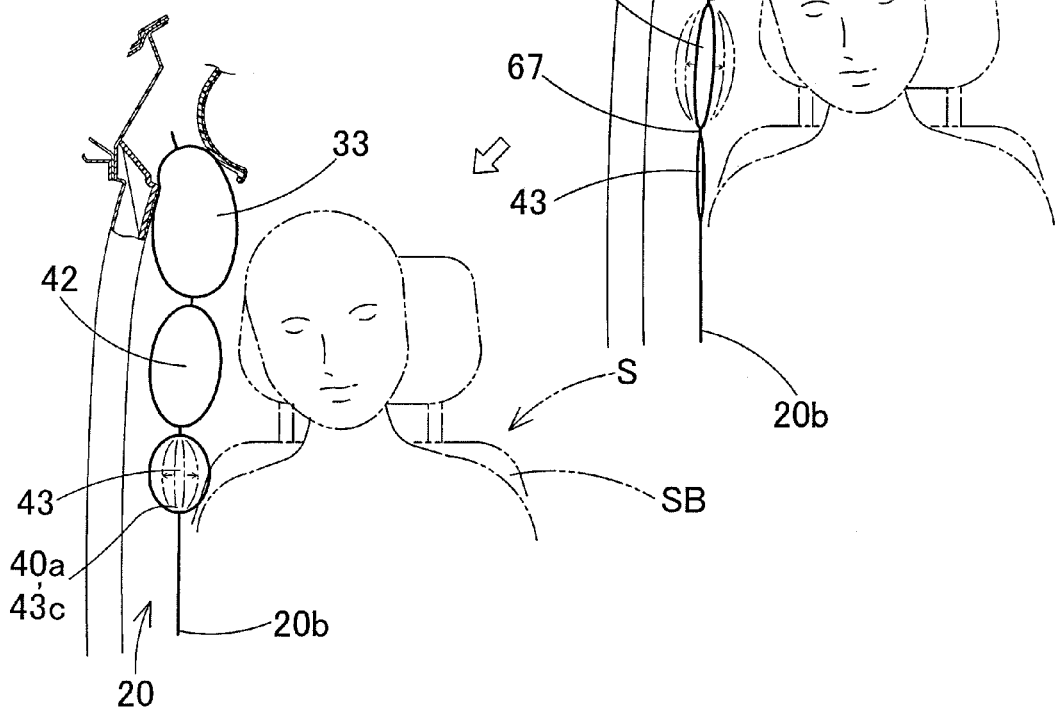

HEAD-PROTECTING AIRBAG DEVICE

CROSS REFERENCE TO RELATED APPLICATIONS

The Present application claims priority from Japanese Patent Application No. 2014-013752 of Kashio, filed on Jan. 28, 2014, the disclosure of which is hereby incorporated into the present application by reference.

BACKGROUND OF THE INVENTION

1. Field of the Invention

The present invention relates to a head-protecting airbag device having an airbag that is adapted to be stored at upper peripheries of windows of a vehicle in a vehicle interior for deployment over the windows and includes inflatable portions for covering inboard sides of the windows and a pillar disposed between the windows.

2. Description of Related Art

WO 2013/018781 A discloses a head-protecting airbag device having an airbag that covers inboard sides of front and rear windows of a vehicle as well as an inboard side of a middle pillar disposed between the windows upon deployment. In this airbag, a pillar cover portion for covering the middle pillar takes in an inflation gas from a front window cover portion for covering a window located in front of the middle pillar.

However, the pillar cover portion takes in an inflation gas also from a rear window covering portion for covering a window located at the rear of the middle pillar. Further, the pillar cover portion also includes an outlet port which forwards an inflation gas to an inflatable portion located in front of the front window covering portion.

With this configuration, with an inflation gas from the front window covering portion as well as from the rear window covering portion, the pillar cover portion may inflate almost simultaneously with the front window cover portion. In such an instance, if an inflated portion contacts a seatback of a seat located at an inboard side of the middle pillar, the pillar cover portion may fail to deploy to the lower edge but complete inflation at a side of the seat, which may further cause an incomplete deployment of the front window cover portion and rear window cover portion.

JP2009-227161 A also describes an airbag provided with a pillar cover portion. The pillar cover portion serves as a secondary inflatable portion which helps prevent an abrupt boost of an internal pressure in a front window cover portion as a primary inflatable portion.

Since this pillar cover portion takes in an inflation gas only from the front window cover portion, the pillar cover portion inflates only after the front window cover portion starts to inflate. Accordingly, the airbag easily unfolds to the lower edge in an initial stage of airbag deployment between a middle pillar and a seat located at an inboard side of the middle pillar. However, since the pillar cover portion is formed into a rectangular cell elongated in an up and down direction as viewed from a vehicle interior, if it inflates while unfolding downward and contacts a seatback, the pillar cover portion may fail to deploy to the lower edge but complete inflation at a side of the seat, which may further cause an incomplete deployment of the front window cover portion and rear window cover portion as the above.

SUMMARY OF THE INVENTION

An object of the present invention is to provide a head-protecting airbag device which is capable of deploying an airbag to the lower edge smoothly and adequately although the airbag includes a pillar cover portion deployable at an inboard side of a middle pillar.

The airbag apparatus according to the present invention includes an airbag in a folded-up configuration which is adapted to be stored in a housing area disposed at upper peripheries of a plurality of windows arranged one behind another in a front and rear direction of a vehicle. The airbag is deployable downward at an inboard side of the windows and a middle pillar located between the windows when fed with an inflation gas. The airbag includes a gas admissive region that is inflatable with an inflation gas in such a fashion as to separate an inboard side wall from an outboard side wall. The gas admissive region includes window cover portions for covering the windows, respectively, and a pillar cover portion for covering the middle pillar. The pillar cover portion includes at the upper region an inlet port which is in gas communication with one of the window cover portions located in front of and at the rear of the pillar cover portion for taking in an inflation gas from the window cover portion. The pillar cover portion further includes an upper inflatable portion extending in a front and rear direction from the inlet port and a lower inflatable portion which is in gas communication with the upper inflatable portion at an end of the upper inflatable portion facing away from the inlet port and extends in such a fashion as to turn around downward from the upper inflatable portion and extends in a front and rear direction beneath the upper inflatable portion. The lower inflatable portion includes generally beneath the inlet port a closed leading end. The pillar cover portion inflates and completes inflation with an inflation gas taken in from the inlet port.

With the head-protecting airbag device thus configured, at airbag deployment, the pillar cover portion takes in an inflation gas from one of the adjoining window cover portions via the inlet port and starts to inflate. The inflation gas firstly inflates the upper inflatable portion, and then turns around and inflates the lower inflatable portion. That is, the pillar cover portion does not inflate entirely in an up and down direction but firstly the upper inflatable portion extending in a front and rear direction inflates and then the lower inflatable portion inflates. The upper inflatable portion inflates before the lower inflatable portion starts to inflate. By the time the lower inflatable portion starts to inflate, the adjoining window cover portions have inflated and been unfolded to the lower edges sufficiently, thereby providing an environment for the lower inflatable portion to start to inflate. That is, since the adjoining window cover portions have been unfolded to the lower edges before the lower inflatable portion starts to inflate, the pillar cover portion will be capable of unfolding up to the lower edge. As a consequence, an engagement between the pillar cover portion and a vehicle seat will be prevented, and a smooth deployment of the entire airbag will be secured, and the pillar cover portion will deploy over the middle pillar with the inflated upper inflatable portion and lower inflatable portion.

Since the pillar cover portion is designed to inflate and complete inflation with an inflation gas taken in from the inlet port and a fixed streaming motion of an inflation gas is expected, the pillar cover portion will inflate in order from the upper inflatable portion to the lower inflatable portion in a steady fashion, and an operation described above will be exerted in a steady fashion as well.

Therefore, the head-protecting airbag device of the present invention will be capable of deploying an airbag up to the lower edge smoothly and adequately although it is provided with a pillar cover portion deployable at an inboard side of a middle pillar.

The head-protecting airbag device of the present invention may also be configured as follows:

The airbag further includes a non-admissive region that admits no inflation gas and where the inboard side wall and the outboard side wall stay attached together. The non-admissive region includes a peripheral portion which defines an outer peripheral edge of the gas admissive region and a partitioning portion which partitions areas of the gas admissive region. The partitioning portion includes an upper edge partitioning portion which partitions the upper inflatable portion of the pillar cover portion from an inflatable portion located above the upper inflatable portion, and a front edge partitioning portion and a rear edge partitioning portion which are located at front and rear edges of the pillar cover portion and partitions the pillar cover portion from the window cover portions. The pillar cover portion is surrounded by the upper edge partitioning portion, a region of the peripheral portion disposed at a lower edge of the lower inflatable portion, the front edge partitioning portion and the rear edge partitioning portion. The partitioning portion further includes a horizontal partitioning portion which extends in a front and rear direction from a region of either the front edge partitioning portion or the rear edge partitioning portion where the inlet port is provided, and partitions the upper inflatable portion from the lower inflatable portion.

With this configuration, the pillar cover portion uses the peripheral portion disposed at the lower edge of the airbag as the lower edge, and there is no other inflatable portion below the pillar cover portion. Therefore, the pillar cover portion will steadily unfold up to the lower edge and be deployed at an inboard side of the middle pillar before inflating, with the aid of unfolding of the adjoining window cover portions.

In this configuration, it is desired that the upper edge partitioning portion includes at the end facing toward the inlet port a leading-end bulged portion which is widened generally in a round shape for preventing stress concentration upon airbag inflation and protrudes toward the upper inflatable portion, and that the horizontal partitioning portion includes at the end facing away from the inlet port a leading-end bulged portion which is widened generally in a round shape for preventing stress concentration and protrudes toward the upper inflatable portion.

With this configuration, since each of the upper edge partitioning portion and the horizontal partitioning portion surrounding the pillar cover portion has at the leading end the round bulged portion, the pillar cover portion will be prevented from a damage from stress concentration due to increase of an internal pressure upon cushioning an occupant as well as upon completion of inflation.

Moreover, with such leading-end bulged portions, an inflation gas flows into the upper inflatable portion via the inlet port in an upwardly expanding fashion due to the leading-end bulged portion protruding downward, and then the gas flows upward in a vicinity of the leading end of the horizontal partitioning portion due to the leading-end bulged portion protruding upward before heading downward to the lower inflatable portion. The gas then flows downward toward the lower inflatable portion while forming a reverse U shaped current, and then flows toward the leading end of the lower inflatable portion. That is, since an inflation gas makes a detour in an up and down direction in the upper inflatable portion, the lower inflatable portion will start to inflate in a delayed fashion by the detour, and be unfolded further smoothly without contacting a vehicle seat and not cause an incomplete deployment of the airbag.

It is further desired in the head-protecting airbag device of the invention that the pillar cover portion is surrounded entirely, except at the inlet port, by the upper edge partitioning portion, the peripheral portion, the front edge partitioning portion and the rear edge partitioning portion.

With this configuration, the pillar cover portion will take in an inflation gas only from the inlet port, and will be steadily prevented from a fear of contacting a seat which can cause an incomplete deployment, and be unfolded and inflate.

Moreover, it is desired that the inflatable portion located above the upper edge partitioning portion is a gas feed path that provides gas communication between the window cover portions.

With this configuration, the front window cover portion and rear window cover portion located in front of and at the rear of the pillar cover portion will unfold and start to inflate generally at the same time with an inflation gas having flown through the gas feed path, which will help the pillar cover portion to unfold quickly up to the lower edge.

BRIEF DESCRIPTION OF DRAWINGS

FIGS. 6A to 6C are schematic vertical sections of the airbag device of FIG. 1 taken along line VI-VI of FIG. 1, depicting the behavior of the airbag device at deployment;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
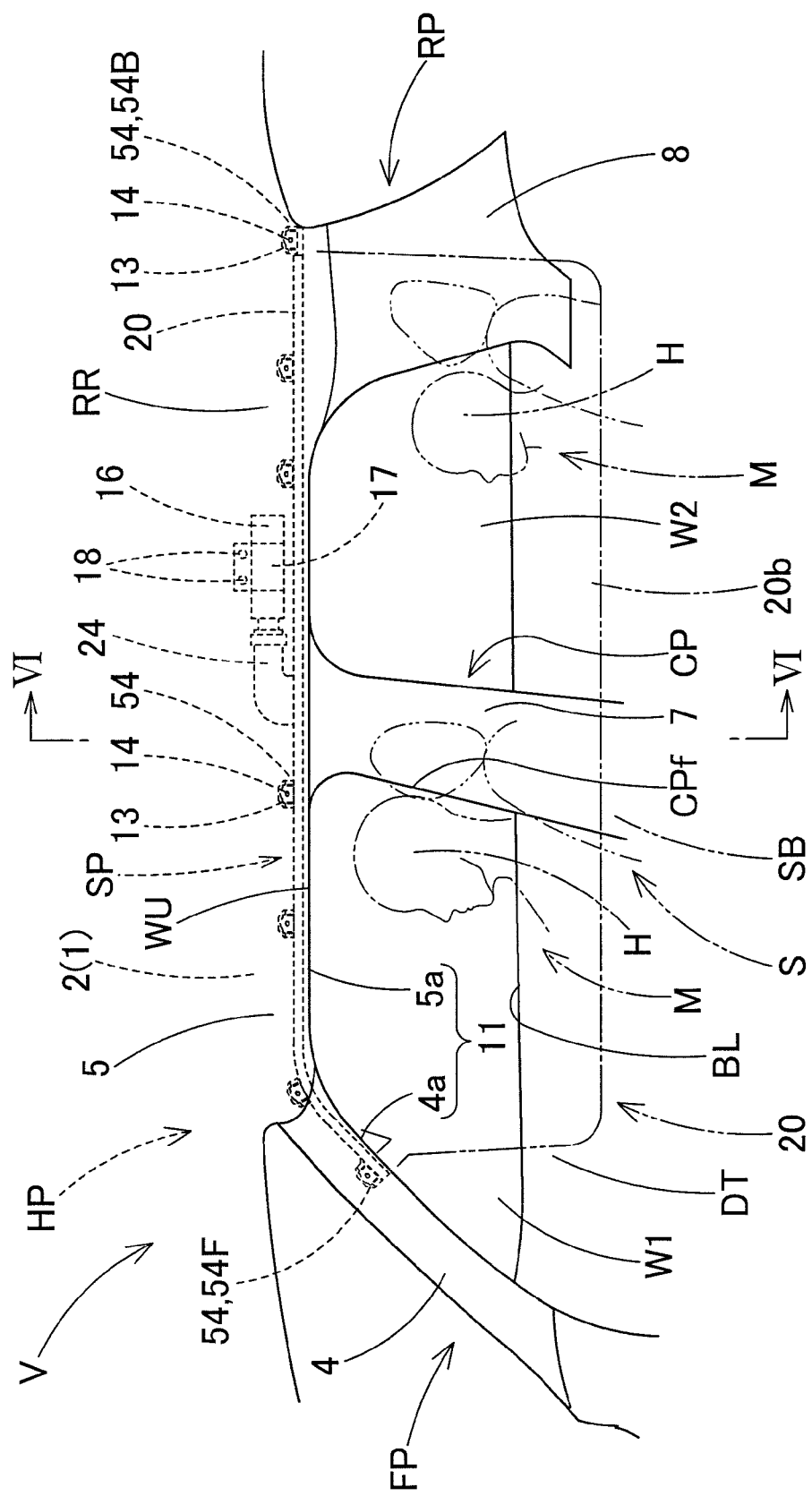
FIG. 1 is a front elevation of a head-protecting airbag device embodying the present invention as mounted on a vehicle, viewed from an interior of the vehicle.

FIG. 1 illustrates a head-protecting airbag device HP embodying the present invention. The airbag device HP includes an airbag 20, an inflator 16 for feeding an inflation gas to the airbag 20, an airbag cover 11, mounting brackets 13, a mounting bracket 17, and bolts 14 and 18. The airbag 20 is stored in a folded-up configuration in a housing area SP disposed at upper peripheries WU of windows (side windows) W1 and W2 of a vehicle V, which windows being disposed one behind the other at a side of a front seat and a rear seat inside a vehicle V. That is, the airbag 20 is stored extendedly in a lower peripheral region of a front pillar FP to a region above a rear pillar RP, via a region above a middle pillar CP.

As shown in FIG. 1, the inflator 16 is formed into a generally cylindrical contour and is inserted into an inlet port 24 of the airbag 20 from which an inflation gas is fed and thus joined with the airbag 20. The inflator 16 is secured to an inner panel 2 at a roof side rail RR located in a vicinity of an upper region of the middle pillar CP, with a mounting bracket 17 holding the inflator 16 and mounting bolts 18 for securing the bracket 17 to the inner panel 2. The inflator 16 is covered with a lower rim 5a of a roof head liner 5. The inner panel 2 belongs to a vehicle body structure 1 of the vehicle V.

The inflator 16 is under control of a predetermined control device for detecting a side impact or a rollover of the vehicle V. An output of the inflator 16 corresponds to a volume of the airbag 20, and is so determined that a later-described protection region 26 can maintain a predetermined internal pressure during a side impact and a rollover.

The mounting brackets 13 secure later-described mounting portions 54 of the airbag 20 to the inner panel 2 by mounting bolts 14. Each of the bolts 14 is fastened into a screw hole on the inner panel 2 provided with a nut or the like.

As shown in FIG. 1, the airbag cover 11 is composed of a lower rim 4a of a front pillar garnish 4 arranged on the front pillar FP and the lower rim 5a of the roof head liner 5 arranged on the roof side rail RR, and covers an inboard side of the airbag 20 stored in the housing area SP. The housing area SP is formed on the inner panel 2 at the front pillar FP and the roof side rail RR.

Figure 2:
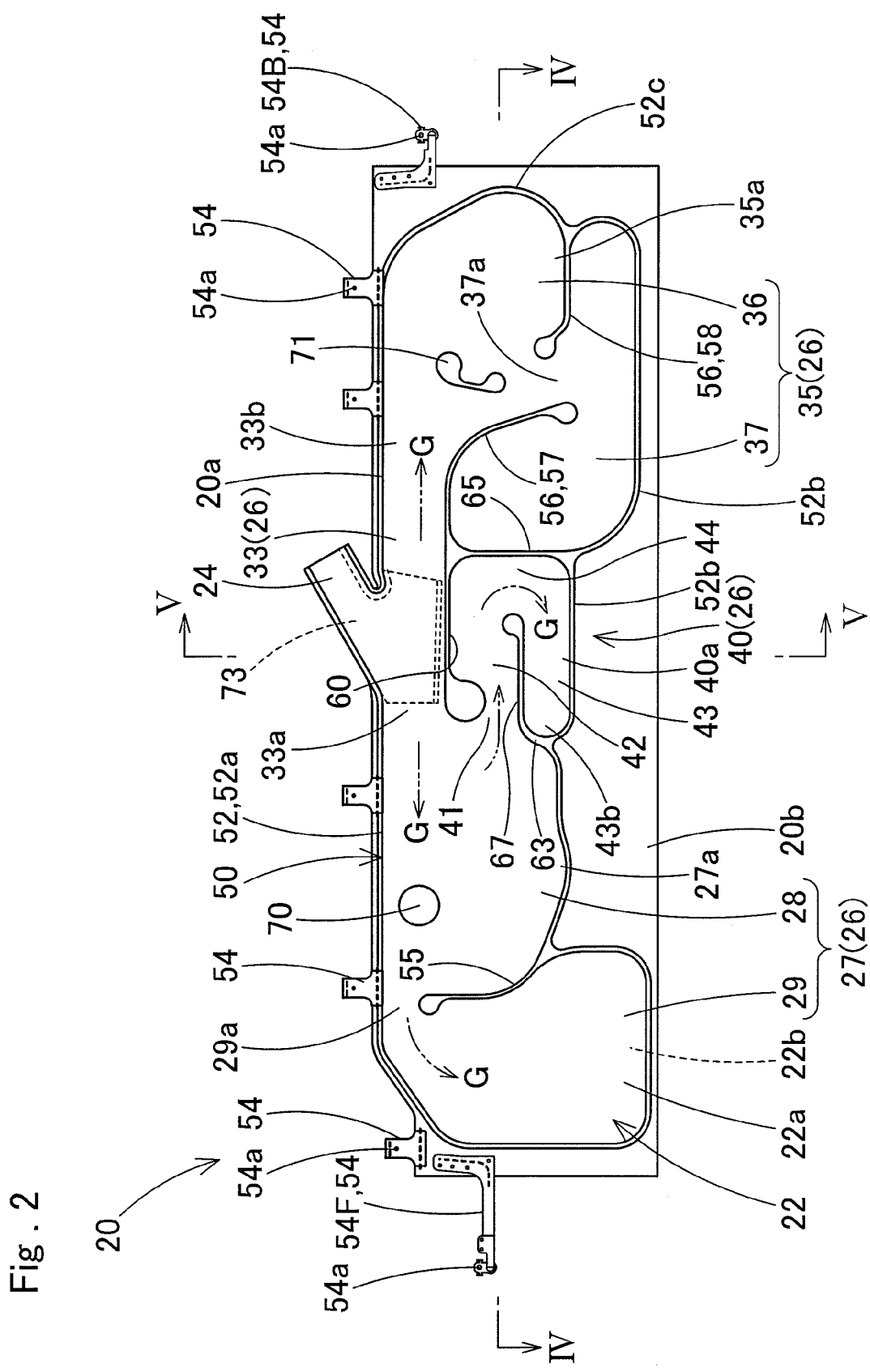
FIG. 2 is a front elevation of an airbag for use in the airbag device of FIG. 1 as is unfolded.
Figure 7:
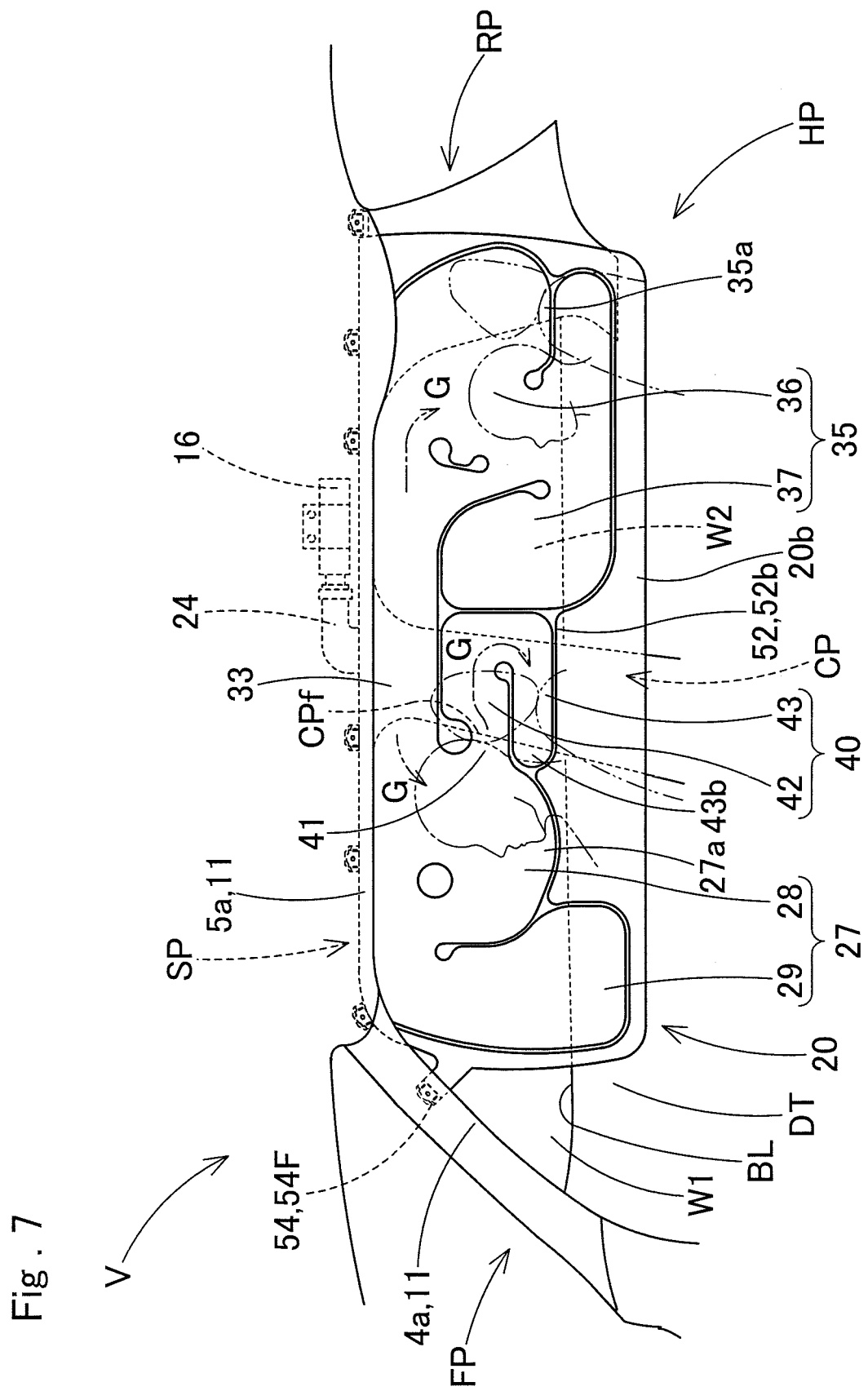
FIG. 7 is a front elevation of the airbag device of FIG. 1 as has completed operation, viewed from an interior of the vehicle.

The airbag 20 is foldably flexible, and as shown in FIG. 2, has a hollow-weave or one-piece woven construction of polyamide yarn, polyester yarn or the like, except later-described mounting portions 54. As shown in FIGS. 1 and 7, the airbag 20 is inflatable with an inflation gas G from the inflator 16 and when unfolded and inflated covers inboard sides of the windows W1 and W2, the middle pillar CP and the rear pillar RP. Moreover, the airbag 20 is configured such that its lower edge 20b is supported, at full deployment, by a part of the vehicle body structure (by a door trim, in the illustrated embodiment) DT at the belt line BL, which belt line BL extends along lower edges of the windows W1 and W2 at an inboard side of the vehicle.

Figure 4:
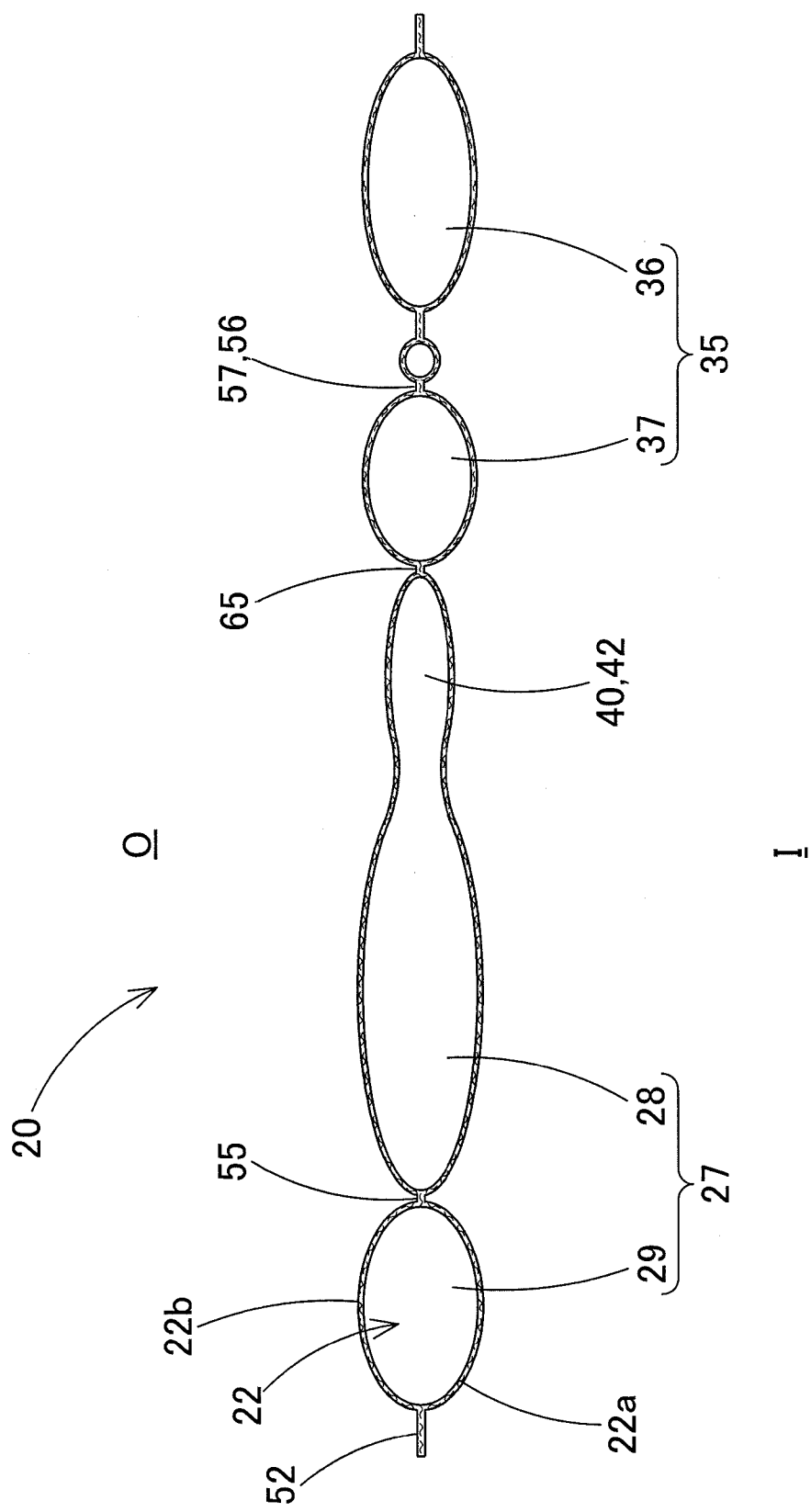
FIG. 4 is a sectional view of the airbag of FIG. 2 as inflated, taken along line IV-IV of FIG. 2.
Figure 5:
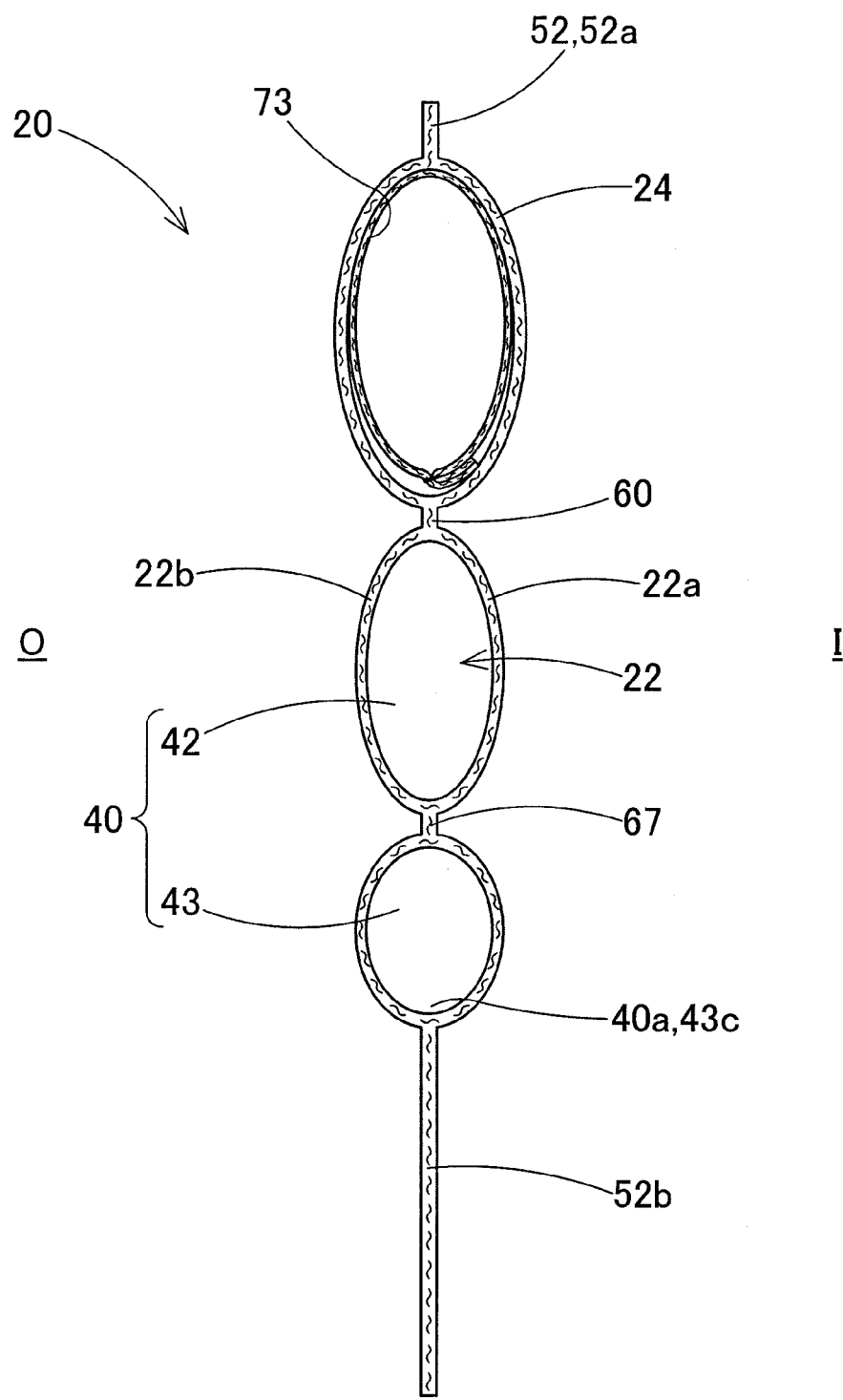
FIG. 5 is a sectional view of the airbag of FIG. 2 as inflated, taken along line V-V of FIG. 2.

Referring to FIGS. 2, 4 and 5, the airbag 20 includes a gas admissive region 22 inflatable with an inflation gas G by separating an inboard side wall 22a from an outboard side wall 22b, and a non-admissive region 50 that admits no inflation gas G, in which non-admissive region 50 the inboard side wall 22a and outboard side wall 22b are attached together.

The gas admissive region 22 includes window cover portions, i.e., a front window cover portion 27 and a rear window cover portion 35, which cover inboard sides of the windows W1 and W2, respectively, a pillar cover portion 40 for covering an inboard side of the middle pillar CP, a gas feed path 33 which is located above the pillar cover portion 40 and provides gas communication between the front window cover portion 27 and rear window cover portion 35, and a tubular inlet port 24 to be connected to the inflator 16. The inlet port 24 protrudes upward from the center in a front and rear direction of the upper edge 20a of the airbag 20. The gas feed path 33 is in gas communication with the lower end of the inlet port 24 and extends forward and backward. The gas feed path 33 is tubular in shape extending in a front and rear direction along the upper edge 20a of the airbag 20. A trifurcate, heat-resistant inner tube 73 is disposed inside the inlet port 24 for delivering an inflation gas G forward and backward at the location of the gas feed path 33. An inflatable protection region 26 for cushioning an occupant M is composed of a region of the gas admissive region 22 except the inlet port 24, i.e., composed of the front window cover portion 27, rear window cover portion 35, pillar cover portion 40 and gas feed path 33.

The front window cover portion 27 includes a main inflatable portion 28 as a primary inflatable portion and a sub inflatable portion 29 as a secondary inflatable portion, and is deployable over the front window W1 in front of the middle pillar CP. The main inflatable portion 28 is in gas communication with the front end 33a of the gas feed path 33 so as to be inflatable prior to the sub inflatable portion 29 for protecting a head H of an occupant M seated in a front seat in the event of a side impact, thus located at an upper reach of an inflation gas G than the sub inflatable portion 29 and at the rear of the sub inflatable portion 29. The sub inflatable portion 29 is inflatable in front of the main inflatable portion 28 for addressing a rollover of a vehicle V. The sub inflatable portion 29 has at the rear upper end an inlet port 29a from which to take in an inflation gas from the main inflatable portion 28.

The rear window cover portion 35 includes a main inflatable portion 36 as a primary inflatable portion and a sub inflatable portion 37 as a secondary inflatable portion, and is deployable over the rear window W2 at the rear of the middle pillar CP. The main inflatable portion 36 is in gas communication with the rear end 33b of the gas feed path 33 so as to be inflatable prior to the sub inflatable portion 37 for protecting a head H of an occupant M seated in a rear seat in the event of a side impact, thus located at an upper reach of an inflation gas G than the sub inflatable portion 37 and at the rear of and above the sub inflatable portion 37. The sub inflatable portion 37 is inflatable in front of and beneath the main inflatable portion 36 for addressing a rollover of a vehicle V. The sub inflatable portion 37 has at the upper region in the rear region an inlet port 37a from which to take in an inflation gas from the main inflatable portion 36.

As shown in FIGS. 2 to 5, the pillar cover portion 40 includes an inlet port 41 at the upper region in the front periphery so as to take in an inflation gas G from the main inflatable portion 28 of the front window cover portion 27. The pillar cover portion 40 further includes an upper inflatable portion 42 and a lower inflatable portion 43 which is inflatable beneath the upper inflatable portion 42. The upper inflatable portion 42 extends from the inlet port 41 rearward (i.e., in a front and rear direction) in a rod shape, and has a communication portion 44 located away from the inlet port 41, which communication portion 44 provides gas communication between the upper inflatable portion 42 and lower inflatable portion 43. The lower inflatable portion 43 extends in such a manner as to turn around downward at the communication portion 44 from the upper inflatable portion 42 and extends forward (i.e., in a front and rear direction) beneath the upper inflatable portion 42 in a rod shape. The front end 43b of the lower inflatable portion 43 is closed generally beneath the inlet port 41 of the upper inflatable portion 42.

The non-admissive region 50 includes a peripheral portion 52 disposed around the gas admissive region 22, various types of partitioning portions 55, 56, 60, 63, 65 and 67 for partitioning inflatable portions of the airbag 20, thickness regulating portions 70 and 71 for regulating a thickness of the airbag 20 upon inflation and mounting portions 54 arranged in an upper end region 52a of the peripheral portion 52.

The mounting portions 54 are formed in plurality in such a manner as to protrude upward from the upper end region 52a of the peripheral portion 52 at the upper edge 20a of the airbag 20. The airbag 20 of the illustrated embodiment includes seven such mounting portions 54. Each of the mounting portions 54 is provided with an aperture 54a for receiving a mounting bolt 14. Each of the mounting portions 54 is fabricated of a woven fabric of polyamide or the like and is sewn to the upper end region 52a of the peripheral portion 52 of hollow-weave. As described above, each of the mounting portions 54 is coupled with the mounting bracket 13 and secured to the inner panel 2 by the mounting bolt 14 inserted through the aperture 54a and screwed into a screw hole of the inner panel 2. A mounting portion 54F located at the foremost position is secured to a vicinity of a generally in the middle in an up and down direction of the front pillar FP such that a strong tension force is exerted at airbag deployment at a lower edge 20*b* of the airbag 20, more specifically on a line connecting the mounting portion 54F and a rearmost mounting portion 54 (54B) away from the front pillar FP, and the airbag 20 can securely arrest an occupant M inside the vehicle (FIG. 7).

The thickness regulating portion 70 is located at the rear of the inlet port 29*a* of the sub inflatable portion 29 in the main inflatable portion 28 of the front window cover portion 27. The thickness regulating portion 71 is located above the inlet port 37*a* of the sub inflatable portion 37 in the main inflatable portion 36 of the rear window cover portion 35.

Each of various partitioning portions is linear. The partitioning portions include a front cover partitioning portion 55 which partitions the front window cover portion 27 into the main inflatable portion 28 and sub inflatable portion 29, a rear cover partitioning portion 56 which partitions the rear window cover portion 35 into the main inflatable portion 36 and sub inflatable portion 37 and those partitioning portions which are arranged around and inside the pillar cover portion 40, i.e., an upper edge partitioning portion 60, a front edge partitioning portion 63, a rear edge partitioning portion 65, and a horizontal partitioning portion 67. The front cover partitioning portion 55 extends upward from the lower end region 52*b* of the peripheral portion 52 to the inlet port 29*a* of the sub inflatable portion 29. The rear cover partitioning portion 56 includes a front section 57 located in front of the inlet port 37*a* of the sub inflatable portion 37 and a rear section 58 located at the rear of the inlet port 37*a*. The rear section 58 extends forward from a rear end region 52*c* of the peripheral portion 52 and the front section 57 extends rearward from a later-described upper edge partitioning portion 60.

The upper edge partitioning portion 60 extends in a front and rear direction and partitions the upper inflatable portion 42 of the pillar cover portion 40 from the gas feed path 33 located above the upper inflatable portion 42. The gas feed path 33 is partitioned at the lower edge from the pillar cover portion 40 and sub inflatable portion 37 by the upper edge partitioning portion 60 and the front section 57 of the rear cover partitioning portion 56.

The front edge partitioning portion 63 partitions the main inflatable portion 28 of the front window cover portion 27 from the pillar cover portion 40 or lower inflatable portion 43 at the front edge of the lower inflatable portion 43, and extends upward from the lower end region 52*b* of the peripheral portion 52 to the inlet port 41. The rear edge partitioning portion 65 partitions the sub inflatable portion 37 of the rear window cover portion 35 from the pillar cover portion 40 at the rear edge of the pillar cover portion 40, and extends upward from the lower end region 52*b* of the peripheral portion 52 and continues to an intersection of the upper edge partitioning portion 60 and the front section 57 of the rear cover partitioning portion 56.

A boundary of the lower edge 40*a* of the pillar cover portion 40 is comprised of the lower end region 52*b* of the peripheral portion 52.

The horizontal partitioning portion 63 extends rearward (i.e., in a front and rear direction) from an upper end of the front edge partitioning portion 63 where the inlet port 41 is provided in a linear fashion in such a manner as to go away from the front window cover portion 27, thus partitions the upper inflatable portion 42 from the lower inflatable portion 43.

Each of the partitioning portions 55, 56, 60 and 67 has at the leading end a widened portion for preventing stress concentration upon airbag inflation. The widened portion of the upper edge partitioning portion 60 formed toward the inlet port 41 constitutes a leading-end bulged portion 61 which is generally round in shape and protrudes downward toward the upper inflatable portion 42. The widened portion of the horizontal partitioning portion 67 formed away from the inlet port 41 constitutes a leading-end bulged portion 68 which is generally round in shape and protrudes upward toward the upper inflatable portion 42.

The pillar cover portion 40 of the illustrated embodiment is surrounded entirely, except at the inlet port 40, by the upper edge partitioning portion 60, the lower end region 52*b* of the peripheral portion 52, the front edge partitioning portion 63 and the rear edge partitioning portion 65.

In the illustrated embodiment, the inlet port 41 is so designed as to be located, upon deployment of the airbag 20 after the airbag device HP is mounted on a vehicle V, in a vicinity of a rim (front rim) CPf of the middle pillar CP facing toward the front window W1, as shown in FIG. 7, and the leading end 43*b* of the lower inflatable portion 43 is slightly forward toward the front window W1 relative to the inlet port 41.

In this specific embodiment, moreover, the leading-end bulged portion 68 of the horizontal partitioning portion 67 is located at an intermediate region in an up and down direction of the pillar cover portion 40, and at an intermediate region in a front and rear direction of the pillar cover portion 40, more specifically at an intermediate region in a front and rear direction of a general region 62 excepting the leading-end bulged portion 61 of the upper edge partitioning portion 60.

An opening width O1 of a general region 42*a* of the upper inflatable portion 42 except a vicinity of the leading-end bulged portion 61, an opening width O2 of the communication portion 44 and an opening width O3 of a general region 43*a* of the lower inflatable portion 43 are generally identical. More specifically, the opening width O3 of the general region 43*a* of the lower inflatable portion 43 is slightly smaller than the opening widths O1 and O2 of the general region 42*a* and communication portion 44.

Further, the lower edge 27*a* of the main inflatable portion 28 in the front window cover portion 27 and the lower edge 35*a* of the main inflatable portion 36 in the rear window cover portion 35 are arranged at the same level as the lower edge 43*c* of the lower inflatable portion 43, i.e., as the lower edge 40*a* of the pillar cover portion 40.

The inlet port 41 of the pillar cover portion 40 is located immediately beneath the front end 33*a* of the gas feed path 33 which is continuous with the inlet port 24 of the airbag 20 to be jointed with the inflator 16, in other words, immediately beneath the front end 33*a* of the gas feed path 33 where an inflation gas G having flown into the airbag 20 has a high pressure. Accordingly, the inlet port 41 will be hardly closed and the pillar cover portion 40 will be fed with an inflation gas steadily.

Mounting of the head-protecting airbag device HP on a vehicle V is now described. Firstly, the airbag 20 is folded up in such a fashion as to bring the lower edge 20*b* close to the upper edge 20*a*. In the illustrated embodiment, specifically, a lower region of the airbag 20 is rolled on an outboard side toward the upper edge 20*a* from the lower edge 20*b*, while an area in a vicinity of the gas feed path 33 is folded in a bellows-fashion.

When the airbag 20 is folded up, a breakable wrapping member (not shown) is wound around the airbag 20 for keeping a folded-up configuration. Subsequently, the inflator 16 with the mounting bracket 17 mounted thereon is connected with the inlet port 24 of the airbag 20, and the mounting brackets 13 are attached to the mounting portions 54 of the airbag 20, thereby forming an airbag module. Thereafter, the mounting portions 54 with the mounting brackets 13 are located at and fastened to the housing area SP on the inner panel 2 of the vehicle body structure 1 by inserting the mounting bolts 14 into the mounting holes 54a and screw holes on the inner panel 2. Further, the inflator 16 is secured to the inner panel 2 by fixing the mounting bracket 17 with the bolts 18, thus the airbag module is mounted on the vehicle body structure 1.

Then the inflator 16 is connected with a not-shown lead wire extending from a suitable control for actuating the inflator. If then the front pillar garnish 4, the roof head liner 5, a middle pillar garnish 7 and a rear pillar garnish 8 are attached to the vehicle body structure 1, the head-protecting airbag device HP is mounted on the vehicle V.

When the head-protecting airbag device HP mounted on the vehicle V is actuated upon a side impact crash or a rollover, the inflator 16 is actuated and discharges an inflation gas G and the gas G flows as indicated by double-dotted lines in FIG .2, and inflates the protection region 26 of the gas admissive region 22. The airbag 20 then pushes and opens the airbag cover 11 and deploys downward from the upper peripheries WU of windows W1, W2 at an inboard side I of the windows W1, W2 and the middle pillar CP.

At airbag deployment, at an inboard side I of the middle pillar CP, the pillar cover portion 40 takes in an inflation gas G from the main inflatable portion 28 of the front window cover portion 27 via the inlet port 41 and starts to inflate, as shown in FIGS. 3 and 6A to 6C. The inflation gas G firstly inflates the upper inflatable portion 42, and then turns around and inflates the lower inflatable portion 43. That is, the pillar cover portion 40 does not inflate entirely in an up and down direction but firstly the upper inflatable portion 42 extending in a front and rear direction inflates and then the lower inflatable portion 43 inflates. The upper inflatable portion 42 inflates before the lower inflatable portion 43 starts to inflate. By the time the lower inflatable portion 43 starts to inflate, the main inflatable portions 28 and 36 of the front and rear window cover portions 27 and 35 have inflated and the lower edges 27a and 35a of the window cover portions 27 and 35 have been also unfolded sufficiently, thereby providing an environment for the lower inflatable portion 43 to start to inflate. That is, since the front and rear window cover portions 27 and 35 have been unfolded to the lower edges 27a and 35a before the lower inflatable portion 43 starts to inflate, the pillar cover portion 40 will be capable of unfolding up to the lower edge 40a in such a fashion as to be pulled by the unfolding of the window cover portions 27 and 35. As a consequence, an engagement between the pillar cover portion 40 and a seatback SB of a vehicle seat S will be prevented, and a smooth deployment of the entire airbag 20 will be secured, and the pillar cover portion 40 will deploy over the middle pillar CP with the inflated upper inflatable portion 42 and lower inflatable portion 43.

Since the pillar cover portion 40 is designed to inflate and complete inflation with an inflation gas G taken in from the inlet port 41, and a fixed streaming motion of an inflation gas G is expected, the pillar cover portion 40 will inflate in order from the upper inflatable portion 42 to the lower inflatable portion 43 in a steady fashion, and an operation described above will be exerted in a steady fashion as well.

Therefore, the head-protecting airbag device HP of the embodiment will be capable of deploying the airbag 20 up to the lower edge 20b smoothly and adequately although it is provided with the pillar cover portion 40 deployable at an inboard side of the middle pillar CP.

In the foregoing embodiment, the non-admissive region 50 of the airbag 20 includes the peripheral portion 52 which defines an outer peripheral edge of the gas admissive region 22 and the partitioning portions 55, 56, 60, 63, 65 and 67 which partition areas of the gas admissive region 22. The pillar cover portion 40 is surrounded by the upper edge partitioning portion 60 which partitions the upper inflatable portion 42 from an inflatable portion 33 located above the upper inflatable portion 42, the lower end region 52b of the peripheral portion 52 disposed at the lower edge 43c of the lower inflatable portion 43, the front edge partitioning portion 63 and the rear edge partitioning portion 65 which are located at front and rear edges of the pillar cover portion 40 and partitions the pillar cover portion 40 from the front window cover portion 27 and rear window cover portion 35. Further, the upper inflatable portion 42 and lower inflatable portion 43 of the pillar cover portion 40 are partitioned by the horizontal partitioning portion 67 which extends rearward (in a front and rear direction) from the front edge partitioning portion 63 (from either the front edge partitioning portion 63 or the rear edge partitioning portion 65) where the inlet port 41 is provided.

With this configuration, the pillar cover portion 40 uses the peripheral portion 52 disposed at the lower edge 20b of the airbag 20 as the lower edge 40a, and there is no other inflatable portion below the pillar cover portion 40. Therefore, the pillar cover portion 40 will steadily unfold up to the lower edge 40a and be deployed at an inboard side I of the middle pillar CP before inflating, with the aid of unfolding of the front window cover portion 27 and rear window cover portion 35.

Further, the upper edge partitioning portion 60 includes at the end facing toward the inlet port 41 the leading-end bulged portion 61 which is widened generally in a round shape for preventing stress concentration upon airbag inflation and protrudes toward the upper inflatable portion 42, while the horizontal partitioning portion 67 includes at the end facing away from the inlet port 41 the leading-end bulged portion 68 which is widened generally in a round shape for preventing stress concentration and protrudes toward the upper inflatable portion 42.

Since each of the upper edge partitioning portion 60 and the horizontal partitioning portion 67 surrounding the pillar cover portion 40 has at the leading end the round bulged portion 61/68, the pillar cover portion 40 will be prevented from a damage from stress concentration due to increase of an internal pressure upon cushioning an occupant M as well as upon completion of inflation.

Figure 3:
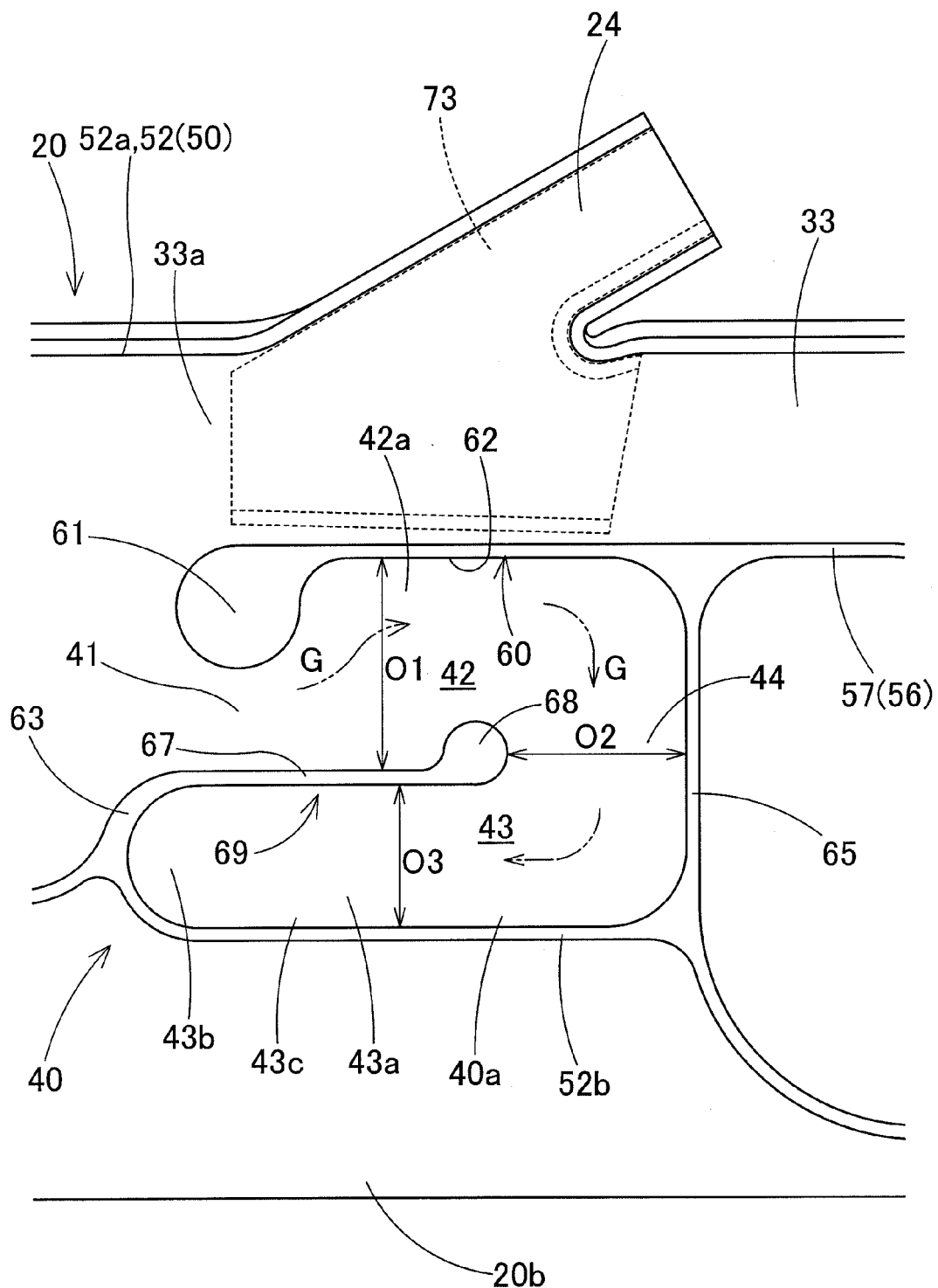
FIG. 3 is an enlarged view of a pillar cover portion of the airbag of FIG. 2.

Moreover, with the leading-end bulged portions 61 and 68, as shown in FIG. 3, an inflation gas G flows into the upper inflatable portion 42 via the inlet port 41 in an upwardly expanding fashion due to the leading-end bulged portion 61 bulging downward, and then the gas G flows upward in a vicinity of the leading end of the horizontal partitioning portion 67 due to the leading-end bulged portion 68 protruding upward before heading downward to the lower inflatable portion 43. The gas G then flows downward toward the lower inflatable portion 43 while forming a reverse U shaped current, and then flows toward the leading end 43b of the lower inflatable portion 43. That is, since the inflation gas G makes a detour in an up and down direction in the upper inflatable portion 42, the lower inflatable portion 43 will start to inflate in a delayed fashion by the detour, and be unfolded further smoothly without contacting a seatback SB of a seat S and not cause an incomplete deployment of the airbag 20.

The pillar cover portion 40 of the foregoing embodiment is surrounded entirely, except at the inlet port 41, by the upper edge partitioning portion 60, the lower end region 52b of the peripheral portion 52, the front edge partitioning portion 63 and the rear edge partitioning portion 65.

With this configuration, the pillar cover portion 40 will take in an inflation gas G only from the inlet port 41, and will be steadily prevented from a fear of contacting a seatback SB of a seat S which may cause an incomplete deployment, and be unfolded It will be conceivable to form a small opening in the lower inflatable portion 43 or in the upper inflatable portion 42 for communication with the front window cover portion 27 or rear window cover portion 35 as long as the pillar cover portion 40 is capable of unfolding in a steady fashion and start to inflate with an inflation gas from the inlet port 41.

In the illustrated embodiment, the inflatable portion located above the upper edge partitioning portion 60 is the gas feed path 33 that provides gas communication between the front window cover portion 27 and rear window cover portion 35.

With this configuration, the front window cover portion 27 and rear window cover portion 35 located in front of and at the rear of the pillar cover portion 40 will unfold and start to inflate generally at the same time with an inflation gas G having flown through the gas feed path 33, which will help the pillar cover portion 40 to unfold quickly up to the lower edge 40a.

Figure 8:
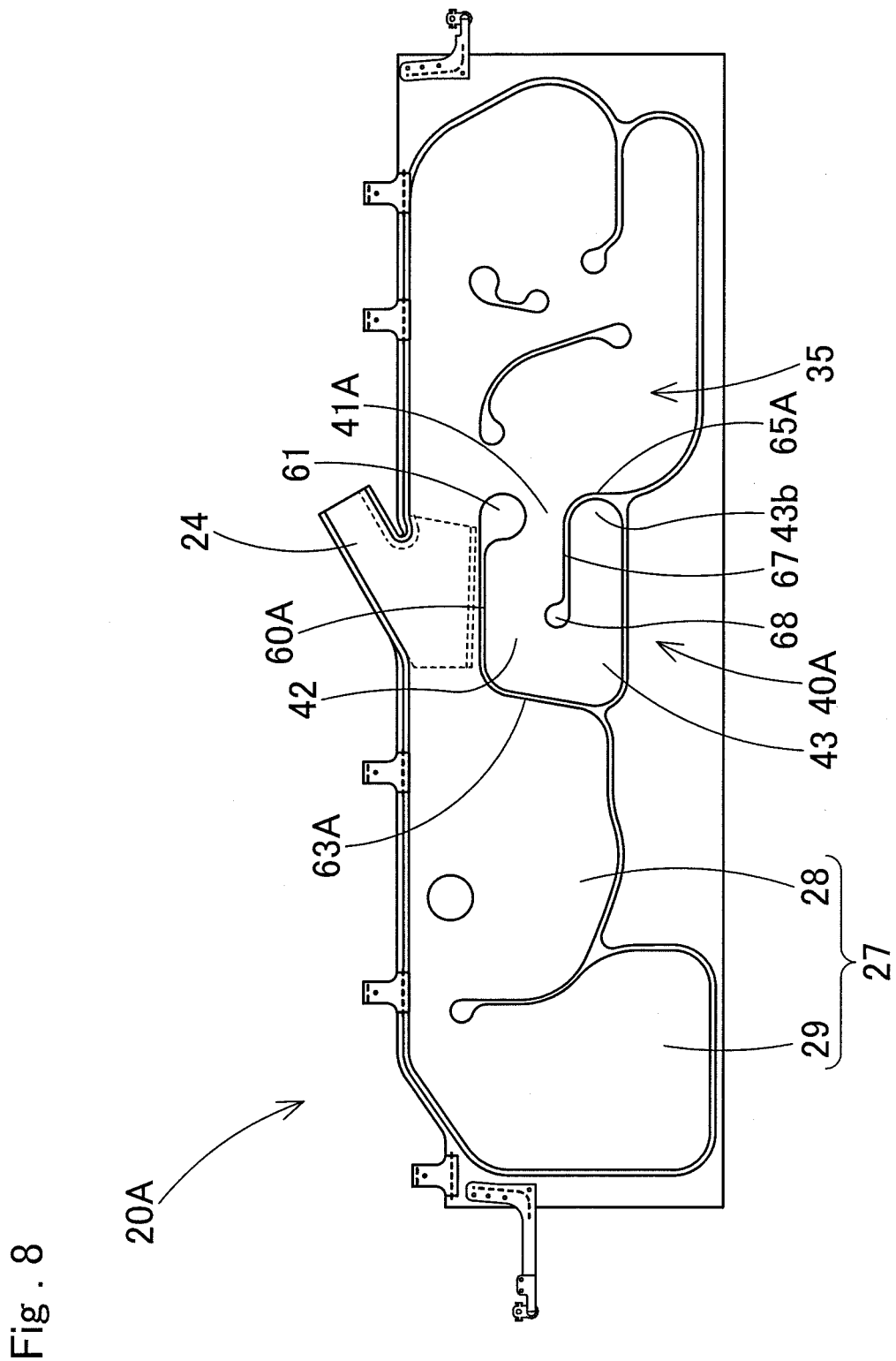
FIG. 8 is a front elevation of a modification of the airbag.

Although the inlet port 41 of the pillar cover portion 40 is located at the front region of the pillar cover portion 40 in the foregoing embodiment, the inlet port may be located at a rear region of the pillar cover portion, as in an airbag 20A depicted in FIG. 8. In the airbag 20A, a pillar cover portion 40A has an inlet port 41A between a rear end of an upper edge partitioning portion 60A and an upper end of a rear edge partitioning portion 65A for taking in an inflation gas G from the rear window cover portion 35.

The pillar cover portion 40 in the foregoing embodiment is provided to deploy over an inboard side of the middle pillar (center pillar, B-pillar) CP located between a front seat and a rear seat of a vehicle V. In addition, a pillar cover portion according to the present application may be so provided as to cover other pillar together with window cover portions located in front of and at the rear of the pillar cover portion. By way of example, in a head-protecting airbag device for a vehicle with three-row seating, a pillar cover portion according to the invention may be provided to cover an inboard side of a middle pillar (C-pillar) located between a second-row seating and a third-row seating. It will also be conceivable to form a pillar cover portion for covering a middle pillar (B-pillar) located between a first row seating and the second-row seating.

Further, although the airbag 20 in the foregoing embodiment has been described as has a hollow-weave construction, an airbag according to the invention may be formed by sewing together an inboard side wall 22a and an outboard side wall 22b at the peripheral portion 52, the partitioning portions 55, 56, 60, 63, 65, 67 or at the thickness regulating portions 70 and 71.

What is claimed is:

1. A head-protecting airbag device having an airbag in a folded-up configuration that is adapted to be stored in a housing area disposed at upper peripheries of a plurality of windows arranged one behind another in a front and rear direction of a vehicle, the airbag being deployable downward at an inboard side of the windows and a middle pillar located between the windows when fed with an inflation gas, the airbag comprising:
    a gas admissive region that is inflatable with an inflation gas in such a fashion as to separate an inboard side wall from an outboard side wall and comprises window cover portions for covering the windows respectively and a pillar cover portion for covering the middle pillar, the pillar cover portion comprising:
        an inlet port that is located in an upper region of the pillar cover portion and is in gas communication with one of the window cover portions located in front of and at the rear of the pillar cover portion for taking in an inflation gas from the window cover portion such that the pillar cover portion inflates and completes inflation with an inflation gas taken in from the inlet port, wherein the pillar cover portion includes only one inlet port;
        an upper inflatable portion that extends in a front and rear direction from the inlet port; and
        a lower inflatable portion that is in gas communication with the upper inflatable portion at an end of the upper inflatable portion facing away from the inlet port and extends in such a fashion as to turn around downward from the upper inflatable portion and extends in a front and rear direction beneath the upper inflatable portion, the lower inflatable portion comprising generally beneath the inlet port a closed leading end.

2. The head-protecting airbag device according to claim 1, wherein:
    the airbag further comprises a non-admissive region that admits no inflation gas and where the inboard side wall and the outboard side wall stay attached together, the non-admissive region comprising:
        a peripheral portion defining an outer peripheral edge of the gas admissive region;
        an upper edge partitioning portion that partitions the upper inflatable portion of the pillar cover portion from an inflatable portion located above the upper inflatable portion;
        a front edge partitioning portion and a rear edge partitioning portion that are located at front and rear edges of the pillar cover portion and partitions the pillar cover portion from the window cover portions; and
        a horizontal partitioning portion extending in a front and rear direction from a region of either the front edge partitioning portion or the rear edge partitioning portion where the inlet port is provided, the horizontal partitioning portion partitioning the upper inflatable portion from the lower inflatable portion; and
    the pillar cover portion is surrounded by the upper edge partitioning portion, a region of the peripheral portion disposed at a lower edge of the lower inflatable portion, the front edge partitioning portion and the rear edge partitioning portion.

3. The head-protecting airbag device according to claim 2, wherein:
    the upper edge partitioning portion includes at an end thereof facing toward the inlet port a leading-end bulged portion which is widened generally in a round shape for preventing stress concentration upon airbag inflation and protrudes toward the upper inflatable portion; and
    the horizontal partitioning portion includes at an end thereof facing away from the inlet port a leading-end bulged portion which is widened generally in a round shape for preventing stress concentration and protrudes toward the upper inflatable portion.

4. The head-protecting airbag device according to claim 2, wherein the pillar cover portion is surrounded entirely, except at the inlet port, by the upper edge partitioning portion, the peripheral portion, the front edge partitioning portion and the rear edge partitioning portion.

5. The head-protecting airbag device according to claim 2, wherein the inflatable portion located above the upper edge partitioning portion is a gas feed path that provides gas communication between the window cover portions.

* * * * *